United States Patent
Nabkel

(10) Patent No.: US 6,178,231 B1
(45) Date of Patent: Jan. 23, 2001

(54) METHOD AND SYSTEM FOR GENERATING PREDETERMINED MESSAGES DURING SELECTED CALLS-IN-PROGRESS

(75) Inventor: Jafar S. Nabkel, Boulder, CO (US)

(73) Assignees: Qwest Communications International Inc., Denver; MediaOne Group, Inc., Englewood, both of CO (US)

(*) Notice: Under 35 U.S.C. 154(b), the term of this patent shall be extended for 0 days.

(21) Appl. No.: 08/937,578

(22) Filed: Sep. 25, 1997

(51) Int. Cl.[7] .................................................. H04M 11/00
(52) U.S. Cl. ..................... 379/88.19; 379/88.2; 379/192; 379/188; 379/197
(58) Field of Search ..................... 379/88.2, 88.01, 379/88.19, 67.1, 70, 68, 84, 201, 210, 213, 192, 191, 190, 196, 197, 93.23, 142, 218, 208

(56) References Cited

U.S. PATENT DOCUMENTS

| | | | |
|---|---|---|---|
| 4,850,007 | * 7/1989 | Marino et al. | 379/88.2 |
| 5,448,625 | * 9/1995 | Lederman | 379/88.2 |
| 5,724,412 | * 3/1998 | Srinivasan | 379/93.23 |
| 5,864,613 | * 1/1999 | Flood | 379/192 |
| 5,903,845 | * 5/1999 | Buhrmann et al. | 379/210 |
| 5,930,343 | * 7/1999 | Vasquez | 379/67.1 |

* cited by examiner

Primary Examiner—Stella Woo
(74) Attorney, Agent, or Firm—Brooks & Kushman, P.C.

(57) ABSTRACT

A method and system for generating a predetermined message during selected calls-in-progress utilizes a communication station to detect a connection being attempted between a subscriber telephony device and a second telephony device. An adjunct processor determines whether the connection between the subscriber telephony device and the second telephony device requires call-attendant monitoring and if so, monitors the connection between the subscriber telephony device and the second telephony device to identify a predetermined event. An intelligent peripheral unit generates the predetermined message based on the predetermined event and a subscriber profile associated with the subscriber telephony device.

2 Claims, 3 Drawing Sheets

METHOD AND SYSTEM FOR GENERATING PREDETERMINED MESSAGES DURING SELECTED CALLS-IN-PROGRESS

CROSS-REFERENCE TO RELATED APPLICATIONS

This invention is related to applications entitled "Method And System For Posting Messages To Callers Based On Caller Identity", having Ser. No. 08/937,577, now U.S. Pat. No. 5,963,626 and "Method and System for Processing Incoming Calls During Calls-In-Progress," having Ser. No. 08/937,576, now U.S. Pat. No. 5,999,613 both of which are assigned to the assignee and have the same filing date as the present application.

TECHNICAL FIELD

This invention relates to methods and systems for generating predetermined messages during selected calls-in-progress.

BACKGROUND ART

Today, individuals' lives are busier than ever due to increasing activities, both professionally and personally. The last thing a busy individual wants to do is spend more time than necessary on the telephone. In fact, some individuals may hesitate to make certain calls for fear they will get "stuck" on the phone for a long period of time. These people often have a difficult time of telling others that they need to hang up. In addition, some people, such as parents in particular, may like to place limits on the amount of time that someone else, a child for instance, can spend talking on the telephone.

Consequently, a need exists for an external mechanism for assisting individuals in terminating certain telephone calls.

DISCLOSURE OF THE INVENTION

It is a general object of the present invention to provide a method and system for processing calls between a subscriber telephony device and a non-subscriber telephony device so as to generate predetermined telephone messages to assist the subscriber in terminating the call.

In carrying out the above object and other objects, features, and advantages of the present invention, a method is provided for generating predetermined messages during selected calls-in-progress. The method includes the step of detecting a connection being attempted between a subscriber telephony device and a second telephony device. The method also includes the step of determining whether the connection between the subscriber telephony device and the second telephony device requires call-attendant monitoring. If monitoring is required, the method further includes the step of monitoring the connection between the subscriber telephony device and the non-subscriber telephony device to identify a predetermined event. Finally, the method includes the step of generating a predetermined message based on the predetermined event and a subscriber profile associated with the subscriber telephony device.

In further carrying out the above object and other objects, features, and advantages of the present invention, a system is also provided for carrying out the steps of the above described method. The system includes a communication station for detecting a connection being attempted between a subscriber telephony device and a second telephony device. The system also includes an adjunct processor for determining whether the connection between the subscriber telephony device and the second telephony device requires call-attendant monitoring and if so, monitoring the connection between the subscriber telephony device and the second telephony device to identify a predetermined event. Still further, the system includes an interactive voice response unit for generating the predetermined message based on the predetermined event and a subscriber profile associated with the subscriber telephony device.

The above object and other objects, features and advantages of the present invention are readily apparent from the following detailed description of the best mode for carrying out the invention when taken in connection with the accompanying drawings.

BEST MODES FOR CARRYING OUT THE INVENTION

A call attendant feature monitors predetermined calls and interrupts them with time reminders and/or timed announcements followed by specific actions. These speech generated or prerecorded messages place the responsibility on the inanimate call attendant to assist the caller in terminating the call. This feature can be preprogrammed ahead of time or on a call-by-call basis, as will be described in greater detail below.

Figure 1:
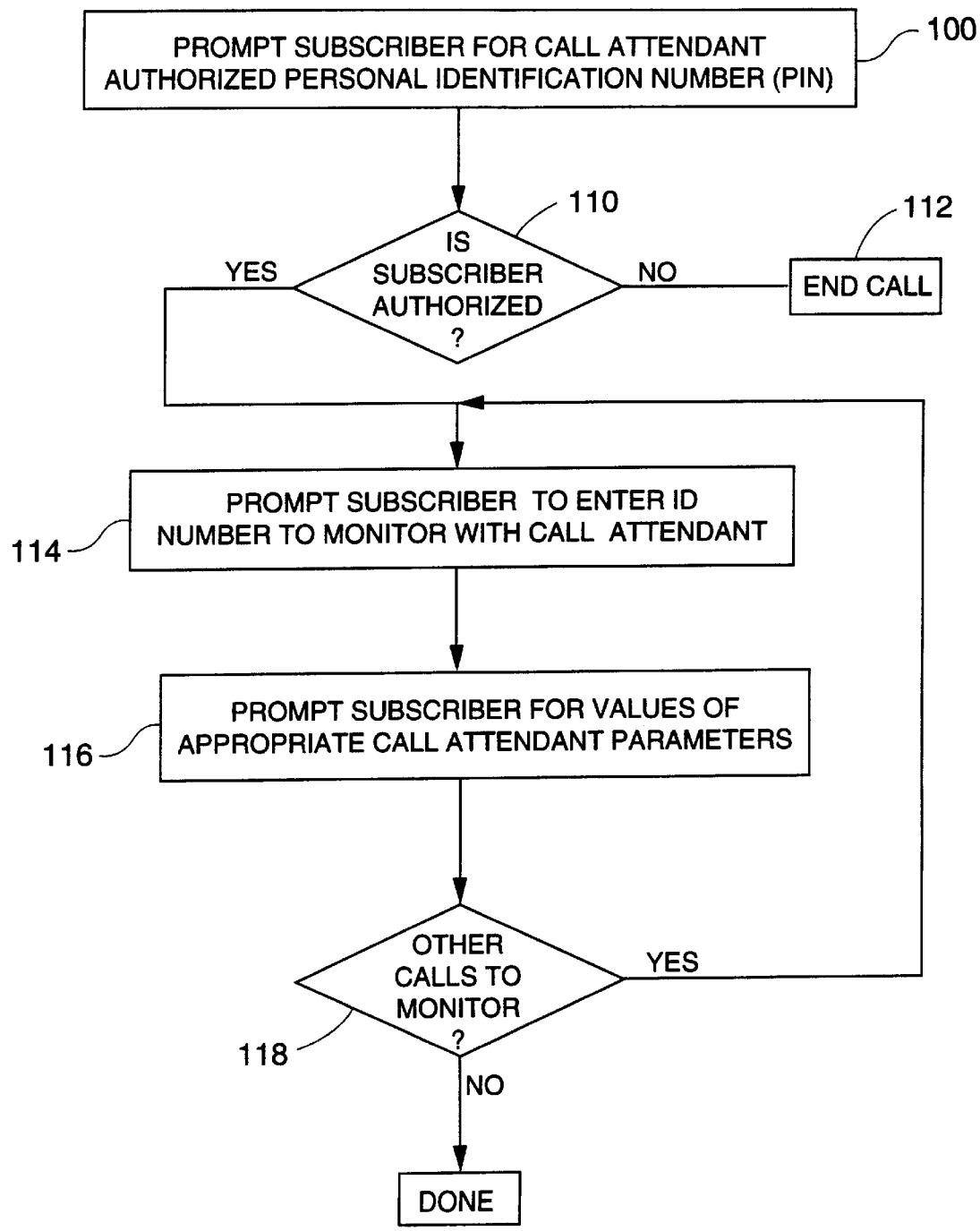
FIG. 1 is a flow diagram illustrating the general sequence of steps associated with configuring the call attendant feature of the present invention.

Turning now to FIG. 1, there is shown a flow diagram illustrating the general sequence of steps associated with configuring the call attendant feature of the present invention. First, the subscriber is prompted to enter his/her personal identification number (PIN), as shown at block 100.

If the PIN indicates that the subscriber is not authorized to access the call attendant feature, conditional block 110, the call is ended as shown at block 112. If the subscriber is authorized, the subscriber is then prompted to enter an identification (ID) number identifying a call to be monitored by the call attendant feature, as shown at block 114. This applies to calls made to the subscriber or calls made by the subscriber. The subscriber then enters appropriate call attendant parameters for the predetermined telephony device, as shown at block 116. These parameters include, but are not limited to, the length of the monitoring time, the action(s) to take (e.g., voice announcements to the subscriber party, special tones, or call termination), maximum call duration, reminder interval, etc.

If there are other calls in which the subscriber would like monitored, the method is repeated, as shown at conditional block 118.

Figure 2:
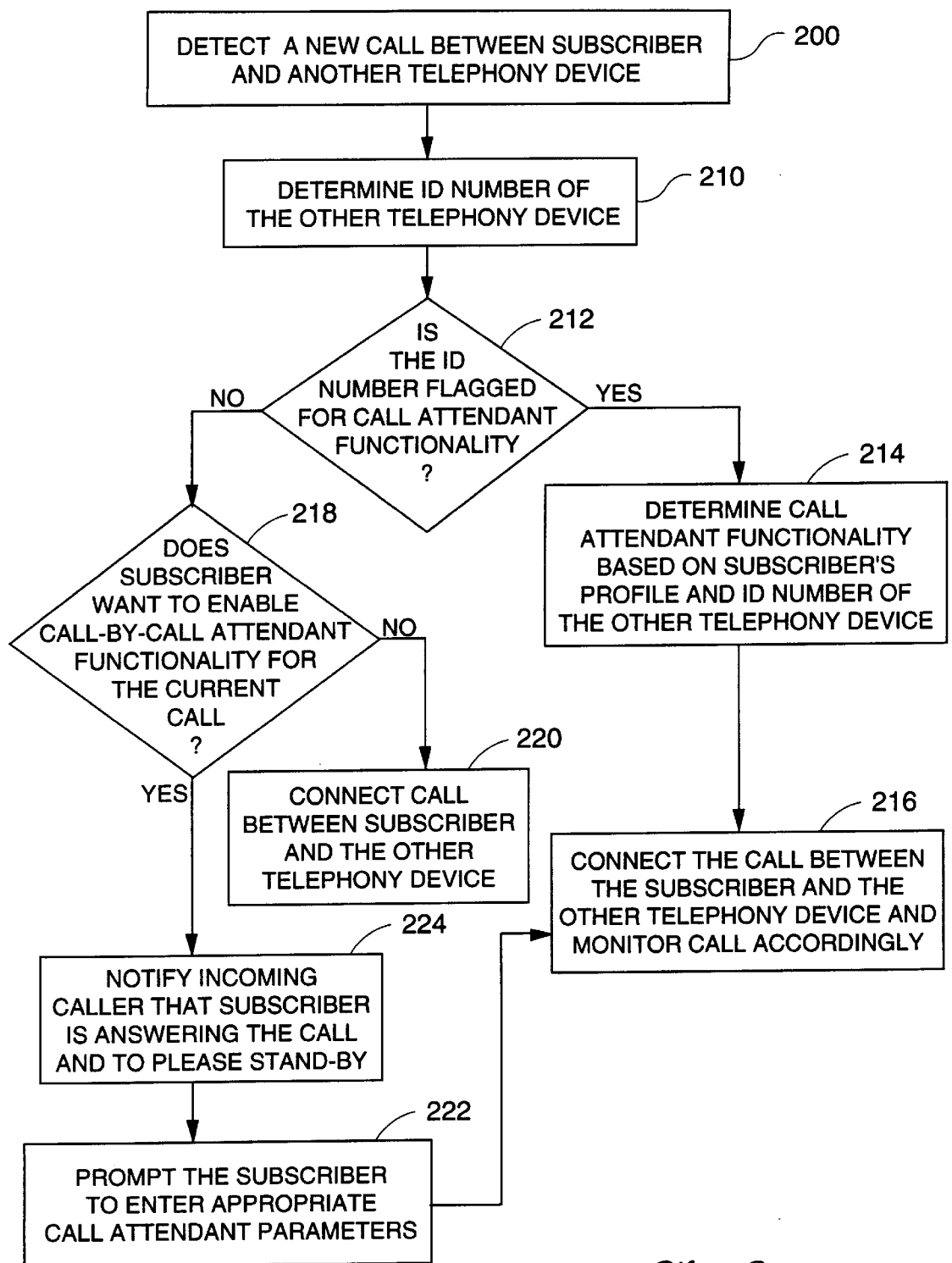
FIG. 2 is a flow diagram illustrating the general sequence of steps associated with the call processing feature of the present invention.

The operation of the call attendant feature of the present invention is illustrated utilizing the flow diagram of FIG. 2. First, the method proceeds to detect a new call originated by the subscriber or a new call incoming to the subscriber, as shown at block 200. Upon detecting a connection between the subscriber and another telephony device, the ID number, such as a telephone number, or an Internet address/call identifier, of the other telephony device is determined, as shown at block 210. The ID number can be determined based on the digits dialed by the subscriber when placing an outgoing call. When receiving an incoming call, the ID number is likely determined through Automatic Number Identification (ANI) or by prompting the caller to enter his/her ID number.

The ID number is then compared with the ID numbers stored in the subscriber's profile to determine if the ID number is flagged for call attendant functionality, as shown at conditional block 212. If so, the type of call attendant functionality specified in the subscriber's profile is determined, as shown at block 214.

The call between the subscriber and the telephony device is connected and monitored accordingly, as shown at block 216. For example, if a reminder functionality is specified, the call attendant feature generates messages that inform the caller about either absolute time or relative time, i.e., elapsed time. These messages may include: "Excuse me, this is your attendant reminder that one hour has elapsed," or "Excuse me, this is your attendant reminder that it is now 7:30 p.m." These reminders/messages are played so that they can be heard by both the subscriber and the other party. This type of reminder assists those people who have something else they would like to do, or need to do, in ending a call.

Alternatively, the call attendant feature may generate messages that inform the caller that a predetermined amount of time is about to expire, or has expired, and then terminate the call, such as "Excuse me, this is your attendant reminder that 50 minutes have elapsed. This call will terminate in 10 minutes," or "Excuse me, this is your attendant reminder that one hour has elapsed. This call is now terminating." This type of reminder assists subscribers in limiting the amount of time spent on a call.

The present invention may include a feature allowing the subscriber to initiate call attendant functionality on a call-by-call basis. Returning to conditional block 212, if the ID number of the telephony device is not flagged to be screened by the call attendant feature, a determination is made as to whether or not the subscriber has authorized call attendant functionality on a call-by-call basis, as shown at conditional block 218. If not, the call is connected between the subscriber and the telephony device and no further action is taken, block 220.

If the subscriber does have call-by-call attendant functionality enabled, the subscriber is prompted to enter appropriate call attendant parameters, as shown at block 222. In the case in which the call is an incoming call to the subscriber, the incoming caller is first notified that the subscriber is answering the call and to please stand-by, as shown at block 224. The incoming caller may be notified via a voice announcement, special tone, visual indicator, or the like.

The present invention may be implemented utilizing an intelligent network (IN) or an Advanced Intelligent Network (AIN). Alternatively, the present invention may be implemented on or adjunct to a communication station such as, for example, a public switch network end office switch, or a Customer Premise Equipment (CPE).

In the preferred embodiment, utilizing AIN, an IN superimposes on an existing telecommunications system a modular configuration of network elements which provide enhanced telecommunications services. Switching functions are performed by the base network in a conventional manner. The IN includes a communication station such as, for example, a service switching point (SSP), an adjunct processor such as, for example, a service control point (SCP). The IN may also include an intelligent processor (IP) which provides specialized functionality, such as speech recognition, voice announcement, and speech synthesis capability. The functionality of the IP may be implemented in a separate network element, or may be implemented through a multimedia SCP.

The SSP is a switch that operates to recognize service requests, process telephone calls, and request/receive call handling instructions to complete a telephone call. The SSP provides intelligent network "triggering"—detecting a condition which requires the SSP to initiate the IN service by sending a query to the SCP—used by the network to recognize requests. The SSP also formulates and transmits requests to the SCP and processes replies and requests from the SCP. The SSP creates and plays intelligent network announcements formulated by the service provider (e.g., the local exchange or interexchange carrier), and transmits event messages (such as busy or no reply signals) to the SCP.

The SCP is an IN element which stores call control and call routing instructions executed by an SSP. The SCP receives requests from the SSP and determines the destination telephone number. The SCP receives and processes event messages from the SSP, and formulates and sends responses to the SSP. The SCP processes accounting and statistical information, such as the number of the calling party, the dialed intelligent network number, duration or type of ringing tone or call waiting signal, and other such call parameters.

Figure 3:
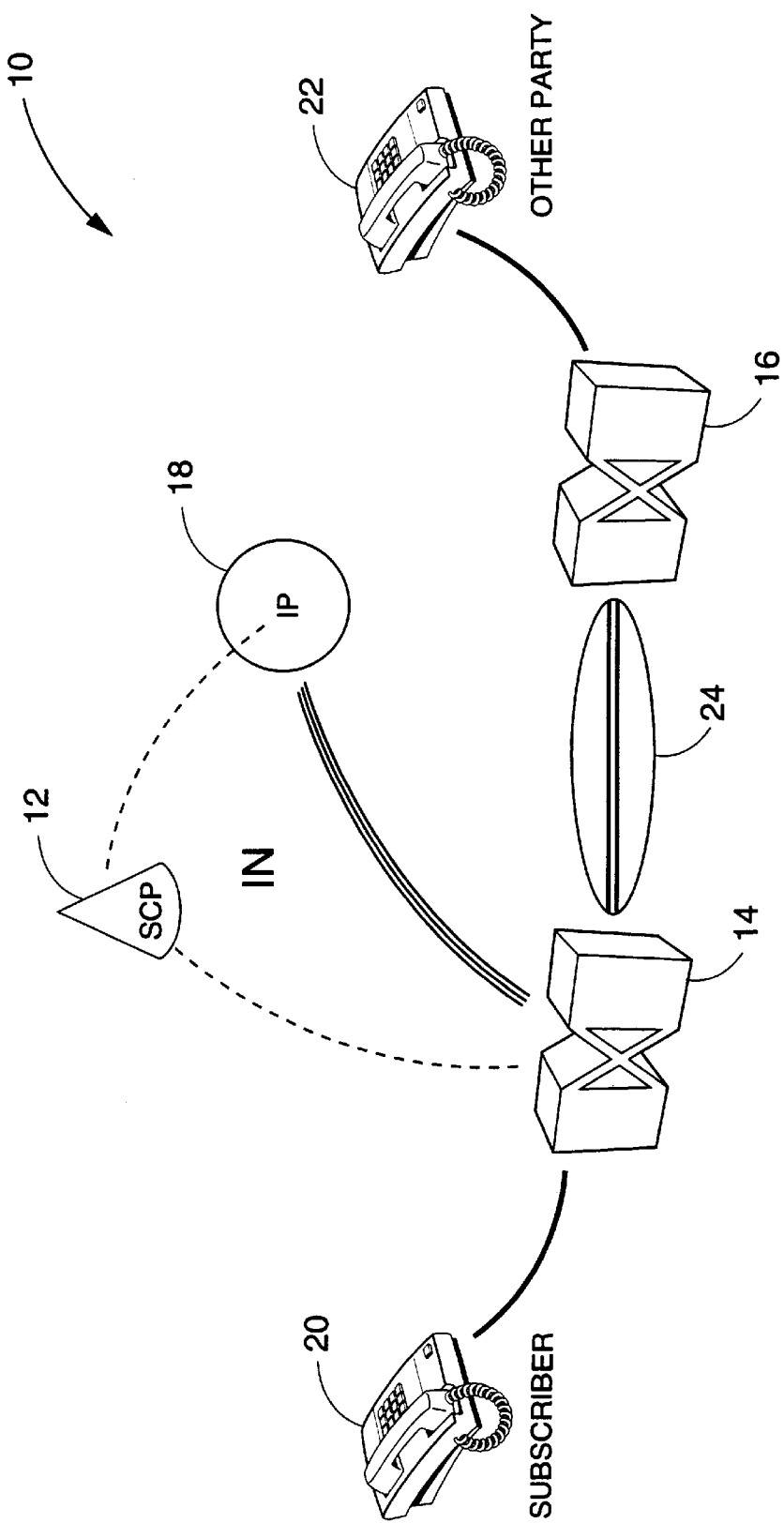
FIG. 3 is a simplified block diagram of a network system architecture suitable for use with the present invention.

An exemplary system architecture suitable for implementing the call attendant functionality in accordance with the present invention will now be described with reference to FIG. 3. The system, denoted generally by reference numeral 10, includes an adjunct processor 12 in communication with communication station 14 and/or communication station 16. Adjunct processor 12, such as an SCP, is provided in communication with communication stations 14 and 16 via Signaling System No. 7 (SS7) protocol or a similar messaging protocol and system. The system 10 further includes IP 18 in communication with adjunct processor 12 and communication station 14 and/or communication station 16.

As shown, communication station 14 is provided in communication with a subscriber telephony device 20, while communication station 16 is provided in communication with a second telephony device 22. Telephony devices 20, 22 may be telephones, text-based telephones, computer telephones, or the like, and are provided in communication with any similar communication station. Any or all of the telephony devices 20, 22 may be in communication with the same communication station or, alternatively, a different communication station via a communication network 24, as shown in FIG. 3. Communication network 24 may be either the Public Switched Telephone Network (PSTN), a data network such as, for example, the Internet, or any other similar communication network.

The operation of the present invention will now be described with reference to FIG. 3. To configure the call attendant feature, the subscriber interfaces with the adjunct processor in one of many ways including, but not limited to, Dual Tone Multifrequency (DTMF) signals via a telephone, a computer interface, a customer service representative, or the like.

Assume for purposes of illustration that the subscriber originates a call to a second party. A similar operation, however, would be performed when the subscriber receives an incoming call from the second party. When the subscriber initiates a call from subscribing telephony device 20, the call encounters a suitable IN or AIN trigger which is preferably, but not necessarily, programmed on the subscriber's originating communication station 14 or other suitable switch. Communication station 14 thereafter transfers call processing to the adjunct processor 12.

The adjunct processor 12 determines the ID number of the second telephony device 22 based on the telephone number dialed by the subscriber. In the case of an incoming call to subscriber telephony device 20, adjunct processor 12 determines the ID number of the second telephony device 22 via automatic number identification (ANI).

Adjunct processor 12 then compares the ID number of the second telephony device 22 with the ID numbers stored in the subscriber's profile. If the ID number of the second telephony device 22 is flagged for call attendant functionality, adjunct processor 12 determines the call attendant functionality for that specific ID number and monitors the call accordingly. When it is time to generate a reminder message or a termination message, adjunction processor 12 will instruct IP 18 to generate the appropriate prerecorded message(s), and/or instruct the communication 14 to take appropriate action such as, for example, terminate the call.

If the ID number of the second telephony device 22 is not flagged for call attendant functionality, adjunct processor 12 determines whether or not the subscriber has call-by-call attendant functionality enabled, i.e., whether or not the subscriber wants to be prompted before each call. If not, adjunct processor 12 connects the call between the subscriber and the second party without further action.

If the subscriber does have call-by-call attendant functionality enabled, adjunct processor 12 instructs IP 18 to play a message to the subscriber prompting him/her to input appropriate call attendant functionality. In the case of an incoming call to the subscriber, the adjunct processor 12 would also instruct the IP 18 to play a message to the second telephony device 22 informing him/her that the subscriber is answering the phone and to stand by for connection to the subscriber.

Once the attendant functionality has been entered by the subscriber for the current call, the adjunct processor 12 monitors the call accordingly to determine when to instruct the IP 18 to take action.

While the best modes for carrying out the invention have been described in detail, those familiar with the art to which this invention relates will recognize various alternative designs and embodiments, such as a communication station (switch-based) or a CPE implementation, for practicing the invention as defined by the following claims.

What is claimed is:

1. A method for generating a predetermined message during selected calls-in-progress, the method comprising:

inputting unique parameters for terminating a possible connection between a subscriber telephony device and a second telephony device;

detecting the connection being attempted between the subscriber telephony device and the second telephony device;

determining whether the connection between the subscriber telephony device and the second telephony device requires call attendant monitoring by determining an identification number of the second telephony device and comparing the identification number with predetermined identification numbers stored in the subscriber profile, if the identification number is not stored in the subscriber profile, then prompting the subscriber to authorize call-attendant monitoring of the connection;

if the identification number is stored in the subscriber profile, monitoring the connection between the subscriber telephony device and the second telephony device to identify a predetermined event; and generating the predetermined message based on the predetermined event and a subscriber profile associated with the subscriber telephony device.

2. A system for generating a predetermined message during selected calls-in-progress, the system comprising:

a communication station for detecting a connection being attempted between a subscriber telephony device and a second telephony device and for determining an identification number of the second telephony device;

an adjunct processor for determining whether the connection between the subscriber telephony device and the second telephony device requires call-attendant monitoring by comparing the identification number with predetermined identification numbers stored in the subscriber profile, if the identification number is not stored in the subscriber profile, then prompting the subscriber to authorize monitoring of the connection and to provide specific parameters in which to monitor the call, if the subscriber authorizes the call, monitoring the connection under previously specified parameters between the subscriber telephony device and the second telephony device to identify a predetermined event; and an intelligent peripheral unit for generating the predetermined message based on the predetermined event and a subscriber profile associated with the subscriber telephony device.

* * * * *